Feb. 15, 1927.

K. G. KUTCHKA 1,617,955

FURNACE FOR HEATING GLASS BLANKS

Filed June 10, 1925   3 Sheets-Sheet 2

INVENTOR
Karl G. Kutchka
by
James C. Bradley
Atty.

Feb. 15, 1927. 1,617,955
K. G. KUTCHKA
FURNACE FOR HEATING GLASS BLANKS
Filed June 10, 1925  3 Sheets-Sheet 3
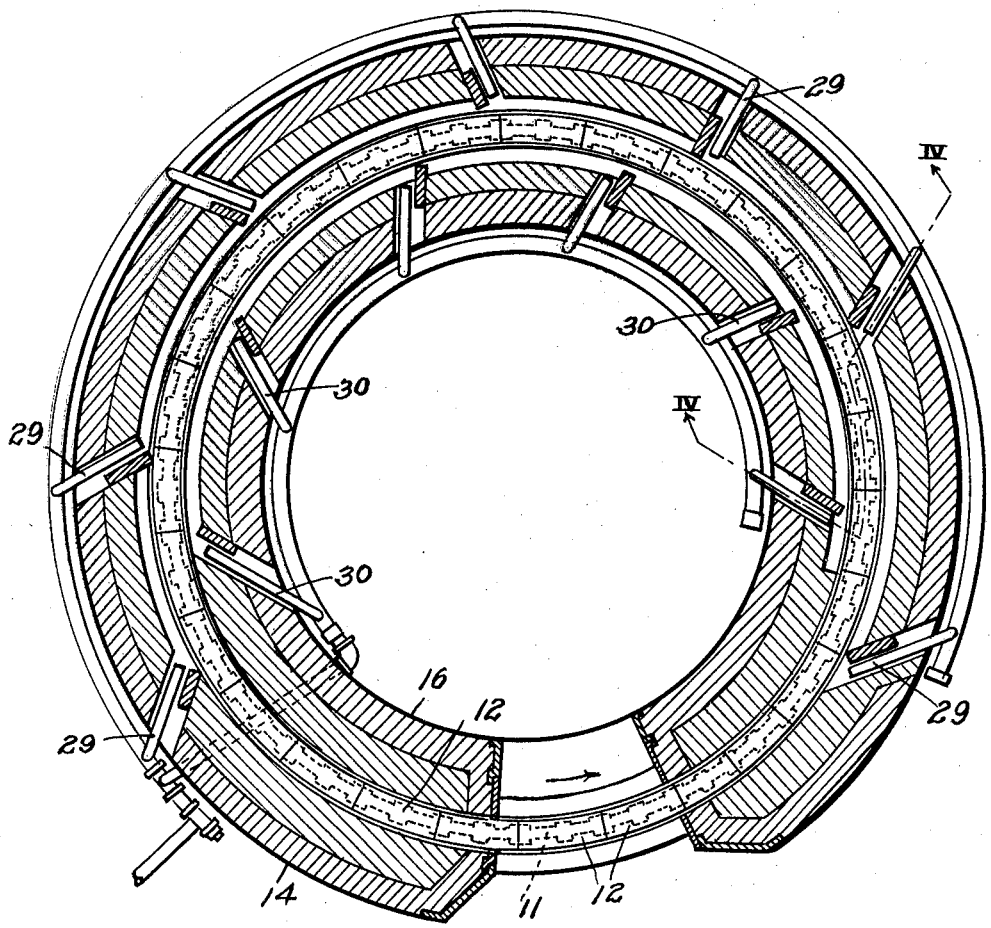
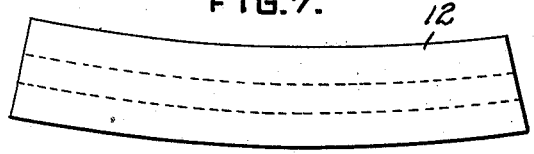
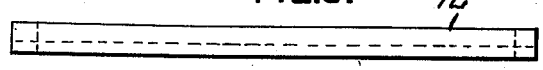
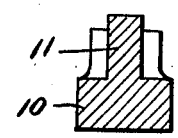
INVENTOR
Karl G. Kutchka Patented Feb. 15, 1927.

1,617,955

UNITED STATES PATENT OFFICE.

KARL G. KUTCHKA, OF WILKINSBURG, PENNSYLVANIA, ASSIGNOR TO PITTSBURGH PLATE GLASS COMPANY, A CORPORATION OF PENNSYLVANIA.

FURNACE FOR HEATING GLASS BLANKS.

Application filed June 10, 1925. Serial No. 36,124.

Figure 1:
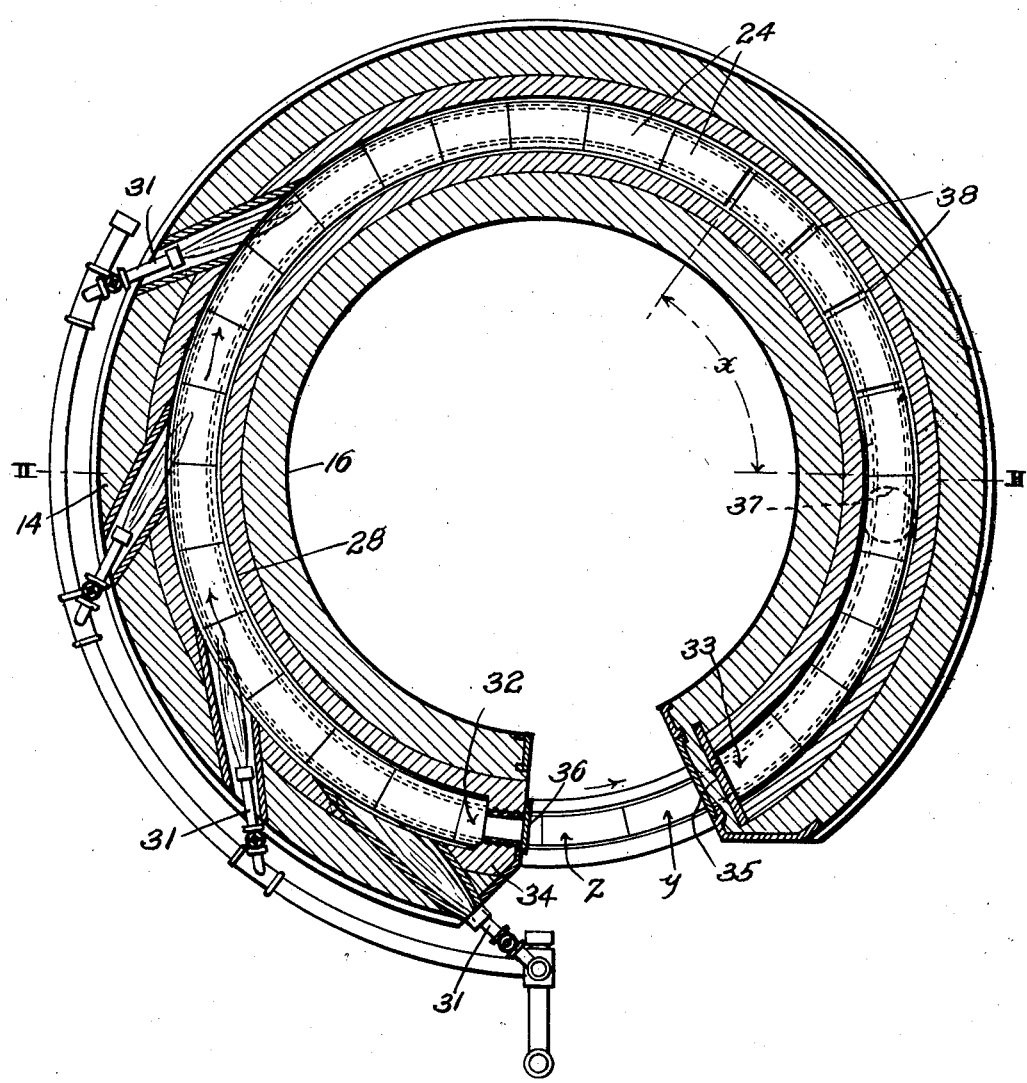
Figure 2:
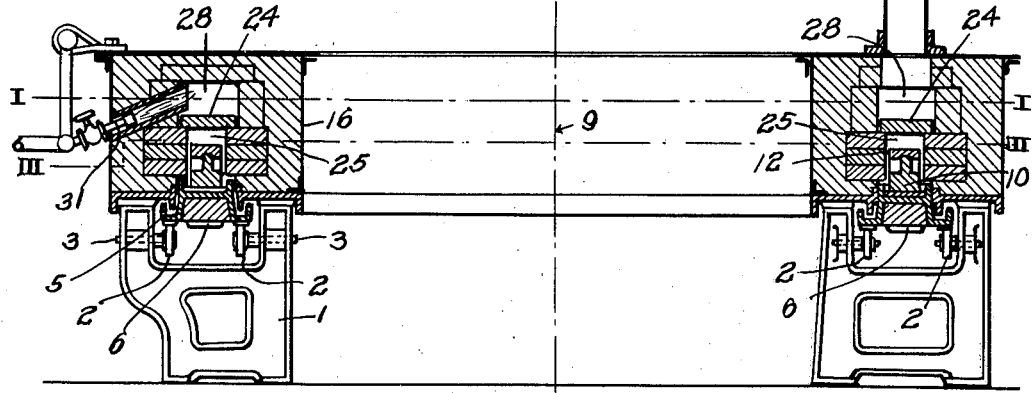
Figure 4:
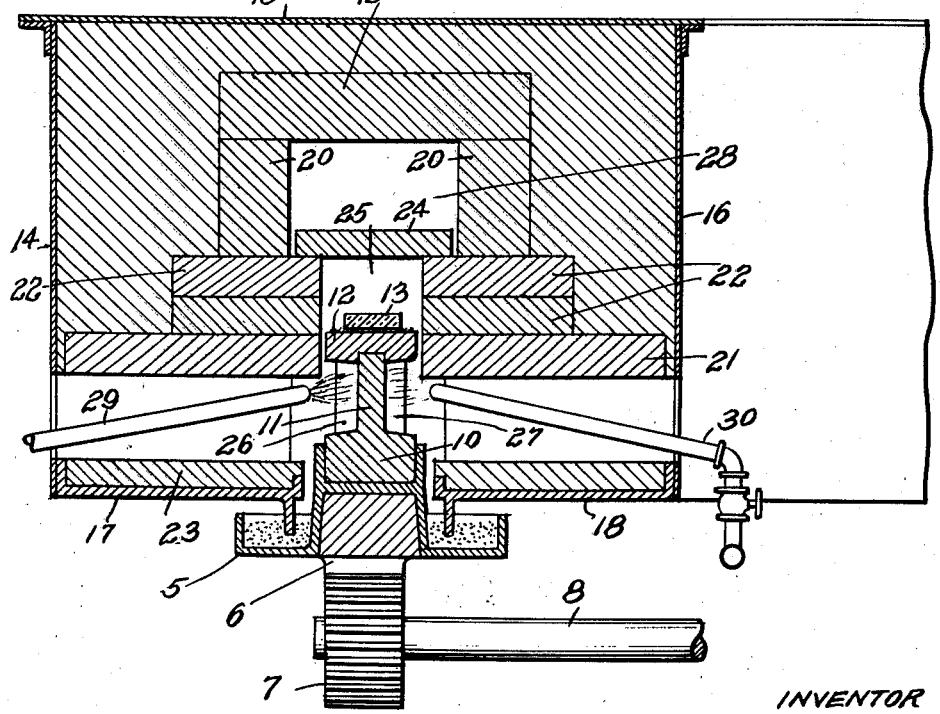

The invention relates to a furnace for heating glass blanks, and particularly to heating blanks for use in optical work to bring them to a proper degree of plasticity for pressing into circular shape. The furnace is of tunnel shape, preferably annular, so that the operation of feeding the blanks to the furnace and that of pressing them may be carried on at adjacent locations. Both operations may thus be looked after by one attendant, and the apparatus is more compact and involves other constructive and operative advantages as compared with a straightaway tunnel furnace construction. The invention has for its primary objects the provision of a furnace in which the application of heat is efficient and economical, and in which the blanks may be brought to the relatively high temperature required for pressing in a short space of time giving the apparatus a large output, and reducing the tendency of the operation to cloud the surfaces of the glass, such as may occur when the blanks are brought up to the desired temperature through too long a period of time. A further object is to secure a uniform heating of the blanks throughout, as opposed to a heating in which the surfaces of the blanks arrive at a temperature considerably above that of their interiors, so that a flowing of such surfaces occurs. One embodiment of the invention is illustrated in the accompanying drawings wherein:

Figure 1 is a horizontal section on the line I—I of Fig. 2. Fig. 2 is a vertical section on the line II—II of Fig. 1. Fig. 3 is a horizontal section on the line III—III of Fig. 2. Fig. 4 is a vertical section on the line IV—IV of Fig. 3. And Figs. 5 to 9 are detail views of the refractory construction which supports the glass blanks, Figs. 5 and 6 showing one of the clay parts, and Figs. 7, 8 and 9 the other.

Referring to the drawings, 1 is the annular supporting framework of the furnace preferably made up of a plurality of castings bolted together. This framework carries an annular track in the form of two sets of rollers 2, 2, journaled upon pins 3, 3 carried by the framework which track is adapted to support the annular carrier for the glass blanks which are to be brought to a temperature for pressing in the furnace.

The carrier consists of a plurality of castings 5 having the cross section indicated in Fig. 2 and suitably bolted together. This carrier has bolted to its under side an annular rack 6 meshing with a driving pinion 7 carried by a shaft 8. This shaft is driven by any suitable means, so that the carrier is slowly rotated about the center line 9 of the furnace. The carrier also includes a refractory support for the blanks which is I shaped in cross section and comprises the base 10 provided with the rib 11 which fits into a suitable groove in the bottom of the plate 12 which carries the blanks 13. This refractory construction is preferably made up in lengths which can be conveniently fabricated, preferably about 30 inches long, and of the connstruction as indicated in detail in Figs. 5 to 9.

The body of the furnace which fits over the carrier and is supported upon the framework 1 is preferably constructed as illustrated in Figs. 2 and 4, such body being made up of a shell of sheet metal plates 14, 15 and 16 and a pair of cast bottom plates 17 and 18 with a suitable lining or filling of insulating and refractory material. Next to the plates constituting the shell is an insulating material preferably consisting of silocel and inside of this silocel are the walls made up of the refractory blocks 19 to 24. These blocks are arranged so as to provide four chambers extending longitudinally of the furnace and designated by the reference numerals 25, 26, 27 and 28. The first of these, the chamber 25 is referred to as the tunnel chamber, as it is through this chamber that the glass blanks 13 which are to be heated are conveyed. The chambers 26 and 27 are heating chambers as is also the chamber 28, such chamber being gas heated, as hereinafter described. The plates 24 which constitute the dividing wall between the chambers 25 and 28 are preferably made of carborundum and are relatively thin so that the heat from the chamber 28 may be transmitted to the chamber 25 and applied to the glass blanks which are carried therethrough.

The chambers 26 and 27 on either side of the rib 11 are heated by means of a series of gas burners 29 and 30 arranged in series as indicated in Fig. 3. These burners supply a large portion of the heat employed in heating the blanks 13, the plates 12 which support the blanks being heated to a very high temperature and transmitting such heat by conduction to the blanks. In this manner, a uniform heat is supplied throughout the body of each blank. The plates 12 fit into the bottom of the chamber 25 with a small amount of clearance at each edge, so that a limited amount of the gases of combustion from the chambers 26 and 27 can pass up into the chamber 25, thus assisting in the heating of the blanks at the sides and from above.

The chamber 28 which is above the chamber 25 and in parallel therewith is heated by means of the gas burners 31, as indicated in Fig. 1, these burners being arranged to supply their heat during the last half of the travel of the blanks, although the chamber 28 extends from the point 32 (Fig. 1) at the outlet end of the furnace to the point 33 at the inlet end thereof, both ends of the chamber are closed, as indicated at 34 and 35, the closure portion 34 being provided with a movable cover 36 through which an inspection may be made of the blanks adjacent the point 32. A stack 37 leads upwardly from the chamber 28, which stack tends to cause a flow of gases in this chamber 28 in a clockwise direction (Fig. 1) from the end which is heated by the burners 31 to the unheated end of the chamber. To still further increase the heating effect of the burners 29 and 30 during a portion of the travel of the blanks, the plates 24 are preferably arranged so that their ends are spaced apart slightly, as indicated at 38 (Fig. 1), the portion of the furnace between which this arrangement obtains being the segment marked $x$ in Fig. 1. At other points in the furnace, the plates 24 come together at their ends. The provision of the spaces 38 tends to produce a draft upward through the chamber 25 to the chamber 28, so that a greater amount of heat flows upward from the burners 29 and 30 past the side edges of the plates 12 at the segment $x$ of the furnace.

The blanks 13 are fed onto the plates 12 by hand or by a suitable feed mechanism at the point $y$, and are removed from such plates after having passed through the furnace at the point $z$, the removal of the blanks being accomplished by a pusher device (not shown), which feeds the blanks to the pressing machine forming no part of the present invention. It will be noted that the burners 29, 30 and 31 are directed longitudinally of the path of travel of the carrier (Figs. 1 and 3) instead of right angles thereto which insures better combustion as the flames are longer, and this gives a more uniform heating of the blanks and tends to avoid overheating of the blanks and clay work in spots. It also promotes the circulation of the heated gases longitudinally of the chambers, such circulation being, in the case of the burners 31, in a direction counter to the direction of movement of the carrier. Although the arrangement is less desirable, it is possible to obtain good results when the wall made up of the plates 24 separating the chambers 25 and 28 is omitted and the invention is not limited to the use of such wall.

What I claim is:

1. In combination, a furnace for heating blanks, comprising a tunnel chamber open at the bottom, an endless carrier for blanks to be heated fitting into the bottom of the chamber and comprising a plate for supporting the blanks with a longitudinally extending supporting rib extending downward from the center of the plate, a longitudinally extending heating chamber on each side of the rib, gas heating means for said chambers, and means for moving the carrier forward to shift the blanks forward through the length of the tunnel chamber.

2. In combination, a furnace for heating blanks, comprising a tunnel chamber open at the bottom, an endless carrier for blanks to be heated fitting into the bottom of the chamber and comprising a plate for supporting the blanks with a chamber extending longitudinally therebeneath, a second chamber above the tunnel chamber extending longitudinally thereof, gas heating means for said chambers lying above and below the tunnel chamber, and means for moving the carrier forward to carry the blanks forward through the length of the tunnel chamber.

3. In combination, a furnace for heating blanks, comprising a tunnel chamber open at the bottom, an endless carrier for blanks to be heated fitting into the bottom of the chamber and comprising a plate for supporting the blanks with a longitudinally extending supporting rib extending downward from the center of the plate, a longitudinally extending heating chamber on each side of the rib, a third heating chamber above the tunnel chamber extending longitudinally thereof, gas heating means for all of said heating chambers and means for moving the carrier forward to carry the blanks forward through the length of the tunnel chamber.

4. In combination, a furnace for heating blanks, comprising a tunnel chamber open at the bottom, an endless carrier for blanks to be heated fitting into the bottom of the chamber and comprising a plate for supporting the blanks with a chamber extending longitudinally therebeneath, a second chamber above the tunnel chamber extending longitudinally thereof, gas heating means for said chambers lying above and below the tunnel chamber, and means for moving the carrier forward to shift the blanks forward through the length of the tunnel chamber, the said second chamber above the tunnel chamber being separated from such tunnel chamber by a relatively thin refractory wall.

5. In combination, a furnace for heating blanks, comprising a tunnel chamber open at the bottom, an endless carrier for blanks to be heated fitting loosely into the bottom of the chamber and comprising a plate for supporting the blanks with a chamber extending longitudinally therebeneath, a second chamber above the gas heating chamber extending longitudinally thereof, gas heating means for said chambers lying above and below the tunnel chamber, and means for moving the carrier forward to shift the blanks forward through the length of the tunnel chamber, the said second chamber above the tunnel chamber being separated from such tunnel chamber by a relatively thin wall having openings therethrough for a portion of its length.

6. In combination, a furnace for heating blanks, comprising a tunnel chamber open at the bottom, an endless carrier for blanks to be heated fitting into the bottom of the chamber and comprising a refractory member I shaped in cross section with its top portion acting as a supporting plate for said blanks, side walls between which the carrier is mounted, thus providing a longitudinal chamber on each side of the central rib of the carrier, gas heating means for said longitudinal chambers, and means for moving the carrier forward to carry the blanks forward through the length of the tunnel chamber.

7. In combination, a furnace for heating blanks, comprising a tunnel chamber open at the bottom, an endless carrier for blanks to be heated fitting into the bottom of the chamber and comprising a refractory member I shaped in cross section with its top portion acting as a supporting plate for said blanks, side walls between which the carrier is mounted, thus providing a longitudinal chamber on each side of the central rib of the carrier, a third chamber above the tunnel chamber extending longitudinally thereof, gas heating means for said chambers lying above and below the tunnel chamber, and means for moving the carrier forward to carry the blanks forward through the length of the tunnel chamber.

8. In combination a furnace for heating blanks comprising an annular tunnel chamber open at the bottom, an annular carrier for blanks to be heated fitting into the bottom of the chamber, and comprising a plate for supporting the blanks with a longitudinally extending supporting rib extending downwardly from the center of the plate, a heating chamber on each side of the rib, gas heating means for the chambers beneath the plate and means for rotating the carrier to carry the blanks through the length of the tunnel chamber.

9. In combination, a furnace for heating blanks, comprising an annular tunnel chamber open at the bottom, an annular carrier for blanks to be heated fitting into the bottom of the chamber, and comprising a plate for supporting the blanks with a longitudinally extending supporting rib extending downwardly from the center of the plate, a heating chamber on each side of the rib, a third chamber above the tunnel chamber in parallelism therewith, gas heating means for the chambers lying above and below the tunnel chamber, and means for rotating the carrier to carry the blanks through the length of the tunnel chamber.

10. In combination, a furnace for heating blanks, comprising an annular tunnel chamber open at the bottom, an annular carrier for blanks to be heated fitting into the bottom of the chamber, and comprising a plate for supporting the blanks with a longitudinally extending supporting rib extending downwardly from the center of the plate, a heating chamber on each side of the rib, a third chamber above the tunnel chamber in parallelism therewith, gas heating means for the chambers lying above and below the tunnel chamber, and means for rotating the carrier to carry the blanks through the length of the tunnel chamber, the said third chamber above the tunnel chamber being separated from such tunnel chamber by a relatively thin refractory wall.

11. In combination, a furnace for heating blanks, comprising a tunnel chamber open at the bottom, an endless carrier for blanks to be heated fitting into the bottom of the chamber and comprising a plate for supporting the blanks with a chamber extending longitudinally therebeneath, a second chamber above the tunnel chamber extending longitudinally thereof, gas heating means for said chambers lying above and below the tunnel chamber, and means for moving the carrier forward to shift the blanks forward through the length of the tunnel chamber, the said gas heating means comprising burners directed longitudinally of said chambers.

12. In combination, a furnace for heating blanks, comprising a tunnel chamber open at the bottom, an endless carrier for blanks to be heated fitting into the bottom of the chamber and comprising a plate for supporting the blanks with a chamber extending longitudinally therebeneath, a second chamber above the tunnel chamber extending longitudinally thereof, gas heating means for said chambers lying above and below the tunnel chamber, and means for moving the carrier forward to shift the blanks forward through the length of the tunnel chamber, the said gas heating means for the second chamber being directed longitudinally of said chamber in a direction counter to that of the movement of the carrier.

In testimony whereof, I have hereunto subscribed my name this 3rd day of June, 1925.

KARL G. KUTCHKA.